United States Patent
Wood et al.

(12) 
(10) Patent No.: US 6,392,833 B1
(45) Date of Patent: May 21, 2002

(54) REDUCING SELF-EXCITED MECHANICAL RESONANCES IN A DISC DRIVE

(75) Inventors: Roy L. Wood, Yukon; Jason D. Gregg, Oklahoma City, both of OK (US)

(73) Assignee: Seagate Technology, LLC, Scotts Valley, CA (US)

(*) Notice: Subject to any disclaimer, the term of this patent is extended or adjusted under 35 U.S.C. 154(b) by 0 days.

(21) Appl. No.: 09/352,487

(22) Filed: Jul. 13, 1999

Related U.S. Application Data
(60) Provisional application No. 60/092,651, filed on Jul. 13, 1998.

(51) Int. Cl.[7] .............................................. G11B 15/46
(52) U.S. Cl. ...................................... 360/73.03; 360/69
(58) Field of Search ............................... 360/73.03, 69, 360/71, 31

(56) References Cited

U.S. PATENT DOCUMENTS

| | | |
|---|---|---|
| 4,947,093 A | 8/1990 | Dunstan et al. |
| 4,972,316 A | 11/1990 | Dixon et al. |
| 5,051,998 A | 9/1991 | Murai et al. |
| 5,057,785 A | 10/1991 | Chung et al. |
| 5,220,569 A | 6/1993 | Hartness |
| 5,262,907 A | 11/1993 | Duff et al. |
| 5,373,400 A | 12/1994 | Kovacs |
| 5,502,713 A | 3/1996 | Lagerqvist et al. |
| 5,530,705 A | 6/1996 | Malone, Sr. |
| 5,625,506 A | 4/1997 | Dovek et al. |
| 5,627,843 A | 5/1997 | Deng et al. |
| 5,631,999 A | 5/1997 | Dinsmore |
| 5,721,816 A | 2/1998 | Kusbel et al. |
| 5,761,212 A | 6/1998 | Forland, Jr. et al. |
| 5,801,899 A | 9/1998 | Genheimer |
| 5,893,048 A * | 4/1999 | Pate et al. ............ 360/73.03 X |
| 6,055,120 A * | 4/2000 | Schirle .................... 360/73.03 |

OTHER PUBLICATIONS

Daniel Y. Abramovitch; Rejecting Rotational Disturbances of Small Disk Drives Using Rotational Accelerometers; pp. 483–488; San Francisco, USA.

Matthew T. White and Masayoshi Tomizuka; Increased Disturbances Rejection in Magnetic Disk Drives by Acceleration Feedforward Control; pp. 489–494; San Francisco, USA.

* cited by examiner

*Primary Examiner*—Andrew L. Sniezek
(74) *Attorney, Agent, or Firm*—Crowe & Dunlevy (57) ABSTRACT

Apparatus and method for improved operational performance of a disc drive by temporarily decreasing disc rotational velocity to reduce self-excited mechanical resonance established within the drive. The disc drive is first initialized by applying current to the spindle motor to accelerate the disc from rest to a nominal operational rotational velocity. Once initialized, the disc drive is operated in a normal mode, as the temperature of the drive increases from an initial, ambient temperature to an equilibrium temperature. During such operation, when the disc drive detects the presence of a self-excited mechanical resonance, the disc drive proceeds to temporarily decrease the rotational velocity of the disc to a reduced velocity to reduce the effects of the self-excited mechanical resonance. Thereafter, the rotational velocity of the disc is restored to the nominal velocity provided the self-excited mechanical resonance is no longer detected.

14 Claims, 5 Drawing Sheets

REDUCING SELF-EXCITED MECHANICAL RESONANCES IN A DISC DRIVE

RELATED APPLICATIONS

This application claims the benefit of United States Provisional Application No. 60/092,651 entitled RECOVERY METHOD FOR UNSTABLE MECHANICAL RESONANCES OF A HIGH SPEED DISC DRIVE, filed Jul. 13, 1998.

FIELD OF THE INVENTION

This invention relates generally to the field of disc drive data storage devices, and more particularly, but not by way of limitation, to an apparatus and method for improving the operational performance of a disc drive by temporarily decreasing disc rotational velocity to reduce self-excited mechanical resonances during initial stages of operation before the disc drive reaches equilibrium operational temperature.

BACKGROUND

A disc drive is a data storage device used to store and retrieve computerized data in a fast and efficient manner. A typical disc drive comprises one or more rigid discs that are coated with a magnetizable medium and mounted on the hub of a spindle motor for rotation at a constant high speed. The data are stored on the discs in a plurality of concentric circular tracks by an array of transducers ("heads") mounted to a radial actuator for movement of the heads relative to the discs.

The heads are mounted via flexures at the ends of a plurality of arms which project radially outward from an actuator body. The actuator body pivots about a shaft mounted to the disc drive housing at a position closely adjacent the outer diameter of the discs. The pivot shaft is parallel with the axis of rotation of the spindle motor and the discs so that the heads move in a plane parallel with the surfaces of the discs.

Typically, the actuator employs a voice coil motor to position the heads with respect to the disc surfaces. The actuator voice coil motor includes a coil mounted on the side of the actuator body opposite the head arms so as to be immersed in the magnetic field of a magnetic circuit with one or more permanent magnets. When controlled current is passed through the coil, an electromagnetic field is set up which interacts with the magnetic field of the permanent magnets to cause the heads to move across the disc surfaces.

The heads are supported over the discs by actuator slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these to a read signal which is decoded by read channel circuitry of the disc drive.

Control of the position of the heads is typically achieved with a closed loop, digital servo system such as disclosed in U.S. Pat. No. 5,262,907 issued Nov. 16, 1993 to Duffy et al., assigned to the assignee of the present invention. In such a system, servo (positional control) data are interspersed with user data fields used to store the user data, with the servo data being transduced by the heads and provided to the servo system to detect head position and velocity.

During normal operation, head-disc assemblies (HDA) are subject to external and internal shocks or accelerations. A typical internal shock is one generated by the reaction to the motion of the magnetic heads and associated devices during operations. These internal shocks can cause vibrations that may shift the heads off track and cause errors that affect disc drive performance. Prior art disc drives employ servo control circuitry to detect and compensate for a shift in head position resulting from certain shocks. Unfortunately the servo circuitry is only capable of countering the effect of certain accelerations that are not too large.

One area that is difficult for prior art methods to correct involves the self-excitation of mechanical resonances within the disc drive, which are primarily established by rotation of the spindle motor. This non-linear vibration problem is known as a self-excited vibration or a "chirp." A "chirp" is basically a resonance condition in which the excitation level increases with the magnitude of the resonance. This interaction causes a non-linear, highly unstable condition in which the disc drive mechanics vibrate enough to create a non-functional disc drive. It has been found that these resonances are related to the mechanical configuration of the drive, as well as the input vibratory spectrum caused by rotation of the bearings in the spindle. As higher levels of performance are achieved, this problem worsens since higher performances are achieved by increasing the number of discs, rotating the discs at higher rotational speeds and utilizing higher track densities.

Two detrimental effects come from self excited vibrations. First, a disc experiences undesired acoustic noise as resonances are transmitted to the disc drive housing. Secondly, there is an undesired performance degradation as the vibrations cause the heads and discs to vibrate, making positional control during seeking or track following difficult, if not temporarily impossible. Normally a design change can move the resonant frequency away from the excitation frequency, but since some resonant frequencies are temperature dependent, there can still be a problem whenever there is a temperature change. This most often occurs as the disc drive heats up during initial start-up procedures.

It is this need for an improved approach to reducing the effects of self-excited resonances in the drive that the present invention is directed.

SUMMARY OF THE INVENTION

The present invention is directed to an apparatus and method for improving the operational performance of a disc drive by reducing effects of self-excited mechanical resonances established within the disc drive.

As exemplified by preferred embodiments, a disc drive is provided with a spindle motor which supports a disc with a disc recording surface. Data are stored to and retrieved from the disc recording surface by a read/write head which is controllably positionable adjacent the surface. A spindle motor control circuit applies current to the spindle motor to rotate the disc at a desired rotational velocity. A disc drive processor provides top level control of the disc drive, and a temperature sensor provides the processor with an indication of the operational temperature of the drive.

Upon disc drive initialization, the processor instructs the spindle motor control circuit to accelerate the disc from rest to a nominal operational rotational velocity. Normal disc drive operations are thereafter carried out as the operational temperature of the disc drive transitions from an initial, ambient temperature to an equilibrium temperature associated with steady-state operation over an extended period of time.

Before the temperature of the disc drive reaches the equilibrium temperature, when a self-excited mechanical resonance is detected within the disc drive, the processor instructs the spindle motor control circuit to decrease the rotational velocity of the disc to a reduced operational rotational velocity less than the nominal operational rotational velocity. The reduced operational rotational velocity is applied to reduce the effects of the self-excited mechanical resonance by modifying the excitation frequency spectrum input to remaining portions of the disc drive by the spindle motor. After temporarily operating at the reduced velocity, the processor thereafter instructs the spindle motor control circuitry to restore the rotational velocity of the disc to the nominal operational rotational velocity.

Preferably, the mechanical configuration of the disc drive is selected so that the effects of the self-excited mechanical resonance are greater at temperatures less than the equilibrium temperature as compared to when the disc drive is operated at the equilibrium temperature. In this way, temperature dependent mechanical interactions have larger effects upon the disc drive at temperatures below equilibrium temperature and are significantly reduced once the disc drive has completed the warming cycle.

As desired, the processor continues to operate the disc drive at the reduced rotational velocity, or to sequentially switch between the reduced rotational velocity and the nominal operational rotational velocity until the disc drive reaches the equilibrium temperature.

These and various other features as well as advantages which characterize the present invention will be apparent from a reading of the following detailed description and a review of the associated drawings.

BRIEF DESCRIPTION OF THE DRAWINGS

FIG. 6 is a flow chart for a DISC DRIVE OPERATION routine, generally setting forth steps carried out in accordance with preferred embodiments of the present invention.

DETAILED DESCRIPTION

Figure 1:
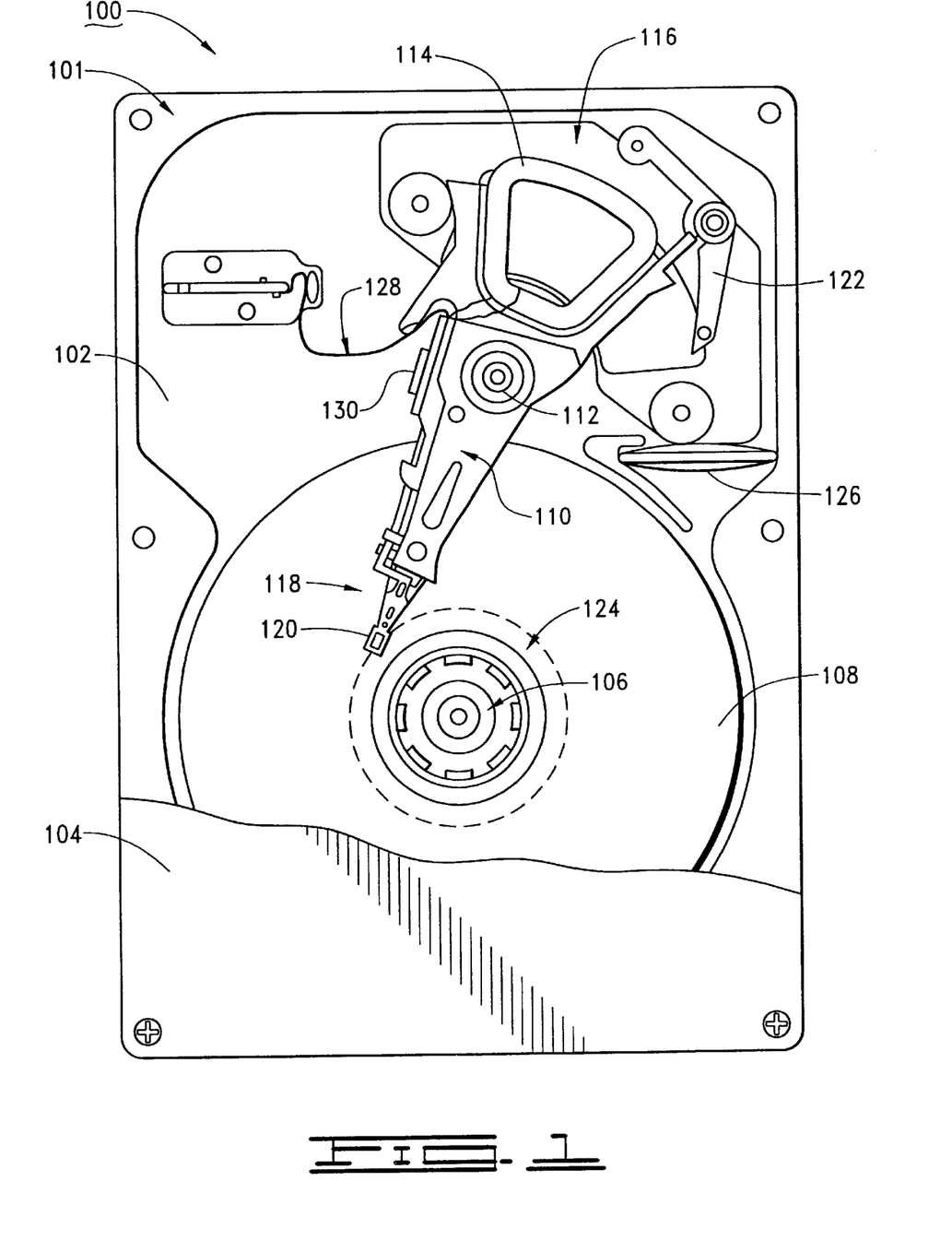
FIG. 1 provides a top plan view of a disc drive constructed in accordance with preferred embodiments of the present invention.

In order to set forth a detailed description of various preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) supporting control electronics used by the disc drive 100. The PWA is mounted to the underside of the HDA 101 and so is not shown in FIG. 1.

The HDA 101 includes a base deck 102 to which various disc drive components are mounted. A top cover 104, shown in partial cutaway fashion, cooperates with the base deck 102 to form a sealed housing for the HDA 101. A spindle motor 106 is provided to rotate a plurality of discs 108 at a constant high speed during normal disc drive operation. For reference, each of the discs 108 has a nominal diameter of 84 millimeters (3.3 inches), and the disc drive 100 has external dimensions which conform to what is commonly referred to in the industry as a "three and one-half inch" form factor.

To access the discs 108, a controllably positionable actuator assembly 110 (also referred to as an "e-block") rotates via a cartridge bearing assembly 112 in response to currents applied to a coil 114 of a voice coil motor (VCM) 116. A plurality of flexible suspension assemblies 118 extend to support a corresponding plurality of read/write head assemblies 120 over the discs 108. The head assemblies 120 are positionably located over data tracks of the discs 108 in order to read data from and write data to the tracks, respectively.

An inertial latch assembly 122 latches the actuator assembly 110 when the disc drive 100 is deactivated so that the head assemblies 108 are brought to rest upon texturized landing zones 124 near the innermost diameters of the discs 108. A recirculation air filter 126 filters out airborne particulate contamination as air is channeled from the rotating discs 108 to cool the actuator coil 114.

A flex circuit assembly 128 facilitates electrical communication between the actuator assembly 110 and the disc drive PWA. The flex circuit assembly 128 includes a preamplifier/driver circuit 130 which applies read bias and write currents to the head assemblies 120.

Figure 2:
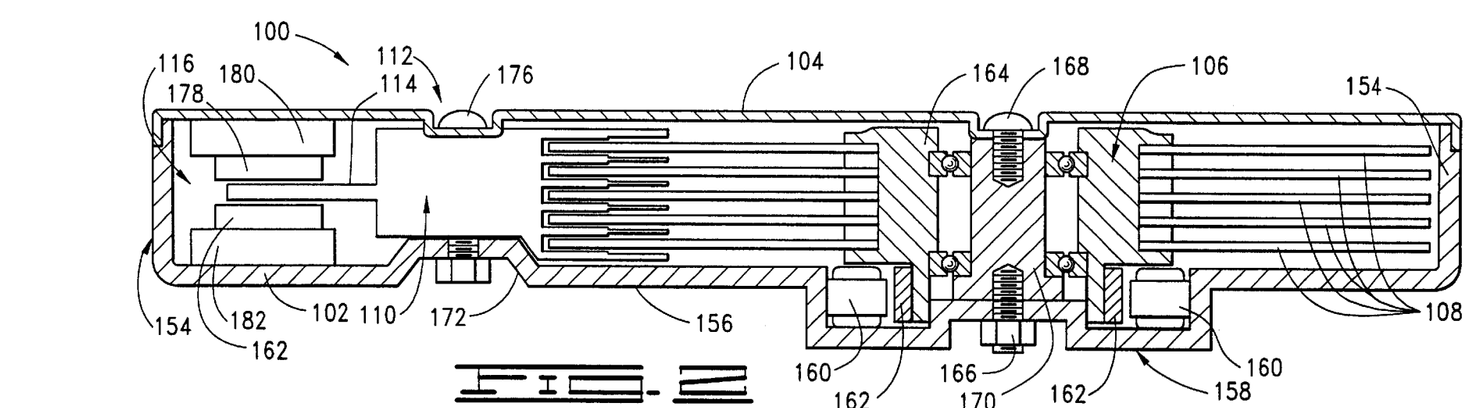
FIG. 2 provides a cross-sectional, elevational view of the disc drive of FIG. 1, with the disc drive printed circuit board omitted for purposes of clarity of illustration.

FIG. 2 provides a cross-sectional, elevational view of the disc drive 100 of FIG. 1. It will be noted that the aforementioned disc drive PWA has been omitted from FIG. 2 for purposes of clarity of illustration, but it will be recognized that the PWA is mounted to the external surface of the base deck 102. As shown in FIG. 2, the base deck 102 includes generally vertical side walls 154 and a generally horizontal base portion 156. The top cover 104 engages with the side walls 154 as shown to form the requisite sealed environment for the disc drive 100.

The base portion 156 of the base deck 102 supports the spindle motor 106 and the actuator assembly 110. More particularly, a boss 158 is provided in the base portion 156 to accommodate a plurality of stationary coils or stator 160 of the spindle motor 106. Permanent magnets 162 are mounted to a rotatable hub or rotator 164 of the spindle motor 106 to which the five discs 108 are attached with ball bearings between the stator 160 and rotator 164. Thus, as will be recognized by those skilled in the art, the coils 160 are selectively energized to generate magnetic fields which interact with the magnetic fields of the permanent magnets 162 in order to rotate the discs 108 in the desired direction at the desired speed. Fasteners 166 and 168 are provided to secure a spindle motor shaft 170 to the base deck 102 and the top cover 104, respectively. More particularly, the fastener 166 comprises a bolt which engages a threaded portion (not separately designated) of the spindle motor shaft 170 which extends down through the base portion 156 and fastener 168 comprises a threaded screw which secures the spindle motor shaft 170 to the top cover 104 by way of a threaded recess in the spindle motor shaft 170. This arrangement provides rigidity, but it also allows vibrations to be readily transferred to the top cover 104 (acoustic noise) and through the base 102 and top cover 104 to the actuator assembly 110 and on out to the head assemblies 120 which causes read and write problems.

Additionally, the base portion 156 of the base deck 102 includes a beveled portion 172 which supports the attachment of the actuator assembly 110. More particularly, a fastener 174 is provided to secure the pivot shaft assembly 112 of the actuator assembly 110 to the base deck 102 and the top cover 104.

The actuator assembly 110 rotates about the pivot shaft assembly 112 in accordance with the operation of the VCM 116, which comprises the actuator coil 114 and the permanent magnet 162, as well as a second permanent magnet 178 and steel plates 180 and 182. It will be recognized that a magnetically permeable flux path (such as a steel plate) is mounted above the actuator coil 114 to complete the magnetic circuit of the VCM 116, but for purposes of illustration this flux field has not been depicted in FIG. 2. When controlled DC current is passed through the actuator coil 114, an electromagnetic field is set up which interacts with the magnetic circuit of the VCM 116 to cause the actuator coil 114 to move relative to the permanent magnet 162. As the actuator coil 114 moves, the actuator assembly 110 pivots about the pivot shaft 112, causing the spindle motor to rotate in the desired direction at the desired speed.

Figure 3:
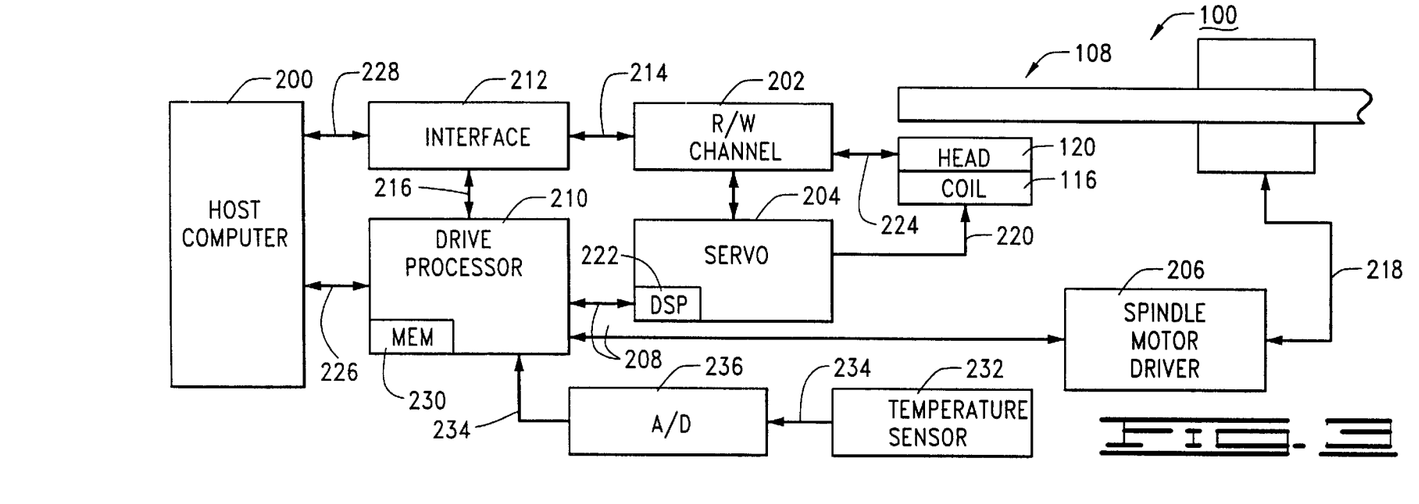
FIG. 3 is a generalized block diagram of functional circuits of the disc drive resident on the disc drive printed circuit board.

FIG. 3 provides a generalized functional block diagram of the disc drive 100, representative of circuitry disposed on the aforementioned disc drive PWA that interacts with the host computer 200. More particularly, FIG. 3 shows the disc drive 100 to generally comprise a read/write channel 202, a servo control circuit 204 and a spindle motor control circuit (also referred to as a spindle motor driver) 206, all operably connected by way of a control bus 208 to a drive processor 210. It will be recognized that the control bus 208 comprises the necessary connections for the drive processor 210 to communicate with and control the servo 204 and spindle motor control 206 circuits. Additionally, an interface circuit 212 is shown connected to the read/write channel 202 (by way of an internal data bus 216), with the interface circuit 212 serving as a data interface for the disc drive 100.

The spindle motor control circuit 206 controls the rotational speed of the spindle motor 106 and discs 108, as generally indicated by signal path 218, in a manner to be discussed in greater detail below. For a general discussion of spindle motor control circuits such as 206, see U.S. Pat. No. 5,631,999 issued to Dinsmore.

The servo control circuit 204 of FIG. 3 is shown to receive servo position information from the head 120 by way of a signal path 220 and, in response thereto, provides a correctional signal by way of the signal path 220 to the actuator coil 114 in order to position the heads 120 with respect to the discs 108. The servo circuit includes a digital signal processor (DSP) 222. The actuator coil 116 interacts with the permanent magnet 162 (FIG. 2) of the VCM 114 as described hereinabove.

The read/write channel 202 passes and conditions data to be written to and read from the disc 108, by way of the signal path 224 and the head 120. That is, in response to a write command received by the drive processor 210 from the host computer 200 (by way of a command bus 226), the drive processor 210 controls the flow of data to be written to the disc from the host computer 200 to the interface circuit 212 (by way of an external data bus 228) and from the interface circuit 212 to the read/write channel 202 (by way of the internal data bus 214). The read/write channel 202, in turn, provides a write current to the head 120 by way of the path 224 in order to write the data by selectively magnetizing selected data tracks on the disc 108. The read/write channel includes a preamp 130 mounted to the side of the actuator 110.

Likewise in response to a read command from the host computer 200, the head 120 detects flux transitions from selected data tracks on the disc 108 and provides an analog read signal to the read/write channel 202, which in turn converts the analog read signal to a digital form and performs the necessary decoding operations to provide data to the interface circuit 212 for output to the host computer 200. The interface circuit has a buffer and sequencer and directs data transfer with input from the drive processor (by way of data bus 216). In controlling these various operations of the disc drive, the drive processor 210 includes the use of programming stored in the drive processor MEM 230.

Continuing with FIG. 3, a temperature sensor (identified generally at 232) provides input signals to the drive processor 210 by way of path 234 in response to temperature changes sensed by the temperature sensor 232. As will be recognized, the temperature sensor 232 is usually mounted to the PWA, although it can be placed inside the HDA. If on the PWA, empirical data can establish a correlation between the temperature of the sensor on the PWA and operational conditions inside the HDA. The temperature sensor 232 will provide an analog signal to an analog/digital (A/D) converter 236, which converts this signal to a series of digital values which are supplied to the drive processor 210 to indicate the temperature of the disc drive during operation.

Figure 4:
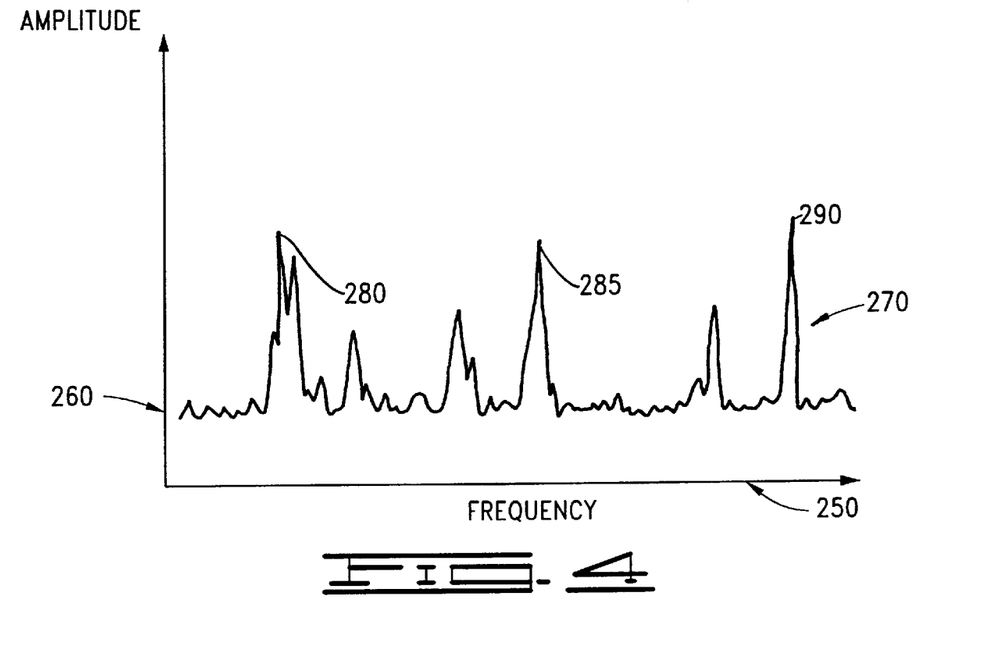
FIG. 4 generally represents mechanical resonance response of the disc drive of FIG. 1 over a broad frequency spectrum at a first operational temperature for a given rotational velocity of the spindle motor.
Figure 5:
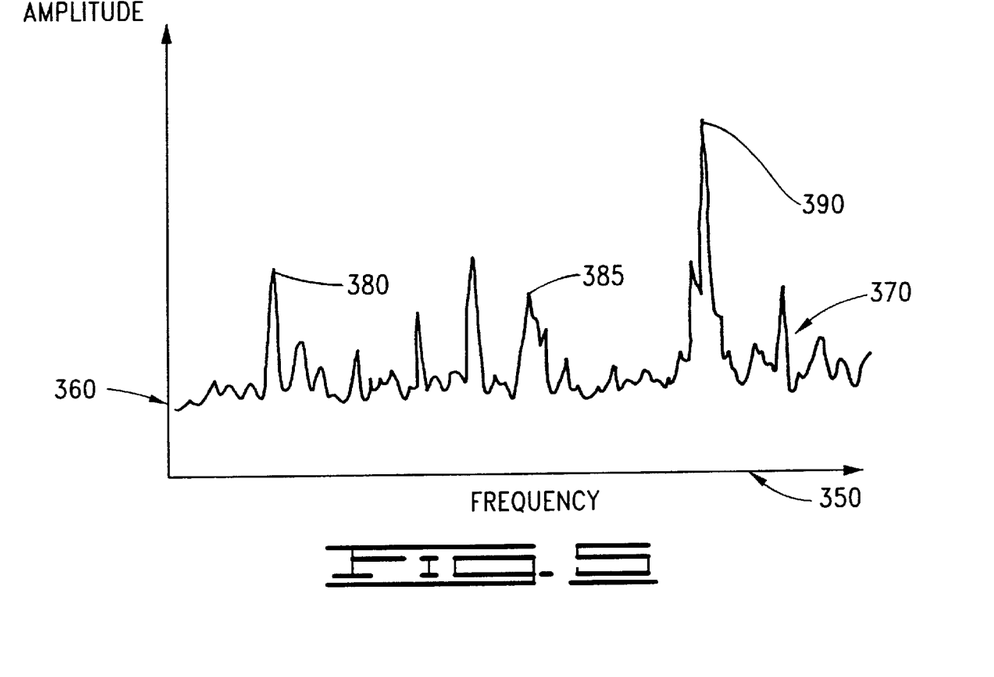
FIG. 5 generally represents mechanical resonance response of the disc drive of FIG. 1 over the same frequency spectrum at a different operational temperature for the same rotational velocity of the spindle motor.

FIG. 4 provides a generalized graph, for illustrative purposes (the actual graph will depend on the mechanical configuration of the disc drive), of the frequency response that a disc drive produces at a set temperature and rotational velocity. The x-axis 250 represents increasing frequencies, the y-axis 260 represents increasing amplitude, and 270 represents the disc drive's frequency response to excitation frequencies set up by the spindle motor 106. FIG. 4 depicts that the greatest frequency response (amplitude) occurs at frequencies 280, 285, and 290. FIG. 5 is a second generalized graph, also for illustrative purposes, that represents the frequency and amplitudes that a disc drive will experience at a different temperature, but same disc rotational velocity. The x-axis 350 represents increasing frequencies, the y-axis 360 represents increasing amplitude, and 370 represents the disc drive's frequency response to excitation frequencies set up by the spindle motor 106 at this different temperature. In comparison to FIG. 4, the greatest frequency response (e.g. the greatest amplitude) occurs at frequency 390 while frequencies 380 and 385 show lower amplitudes. Thus, FIGS. 3 and 4 illustrate that mechanical resonances can be temperature dependent.

Preferably, the mechanical configuration of the disc drive is selected so that the effects of the self-excited mechanical resonance are greater at temperatures less than the equilibrium temperature as compared to when the disc drive is operated at the equilibrium temperature. In this way, temperature dependent mechanical interactions have larger effects upon the disc drive at temperatures below equilibrium temperature and are significantly reduced once the disc drive has completed the warming cycle. Such design configurations can be easily achieved by those skilled in the art using existing computer modeling and empirical design techniques.

The manner in which the disc drive 100 preferably operates to compensate for these temperature dependent mechanical interactions will now be discussed with reference to FIGS. 6–8. FIG. 6 provides a flow chart for a DISC DRIVE OPERATION routine 400, generally illustrative of steps carried out in accordance with preferred embodiments to detect and correct errors caused by self-excited mechanical resonances. The routine 400 generally represents programming stored in MEM 230 and used by the disc drive processor 210. Initially, during initialization of the disc drive 100, as represented by step 410 in the flow chart of FIG. 6.: the discs 108 are brought up to the desired rotational velocity, various circuit parameters are loaded, the heads 120 achieve flight and are moved out over the disc surfaces, and other start-up commands are performed as directed by the disc drive processor 210.

Figure 7:
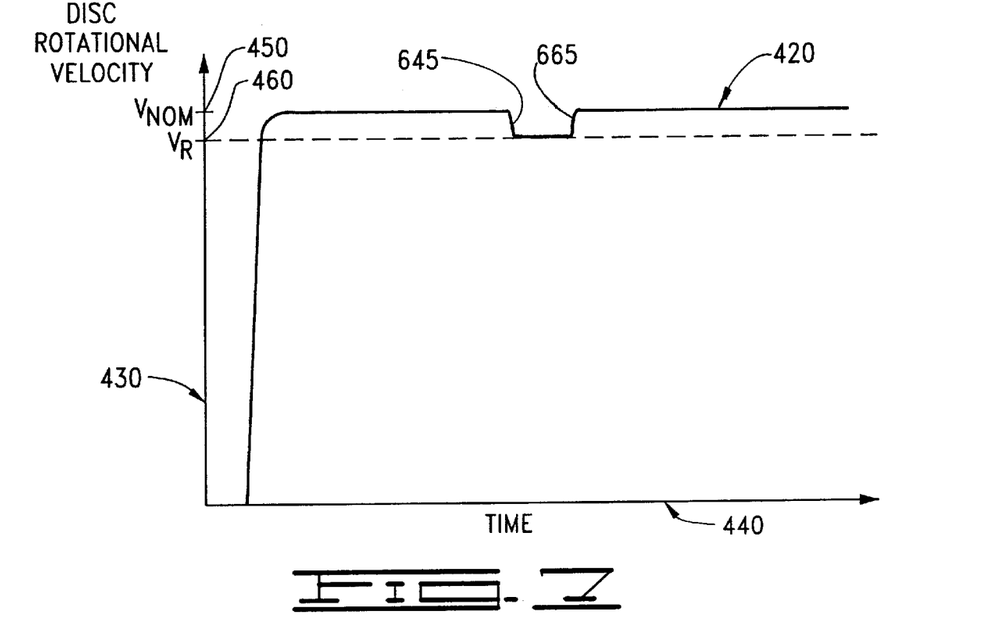
FIG. 7 provides a general graphical representation of the rotational velocity of the discs of the disc drive of FIG. 1, the velocity being selectively varied in accordance with the routine of FIG. 6.

FIG. 7 represents a disc rotational velocity curve 420, plotted against rotational velocity on a y-axis 430 versus time on an x-axis 440. In FIG. 7, an nominal rotational velocity is represented by $V_{NOM}$ 450 and an operating rotational velocity is represented by $V_R$ 460. Upon disc drive initialization, as shown in step 410 of FIG. 6, the processor 210 instructs the spindle motor control circuit 206 to accelerate the disc from rest to the nominal operational rotational velocity (i.e., $V_{NOM}$ as indicated by curve 420 in FIG. 7); for example, this is typically about 10,000 revolutions per minute (rpm).

Figure 8:
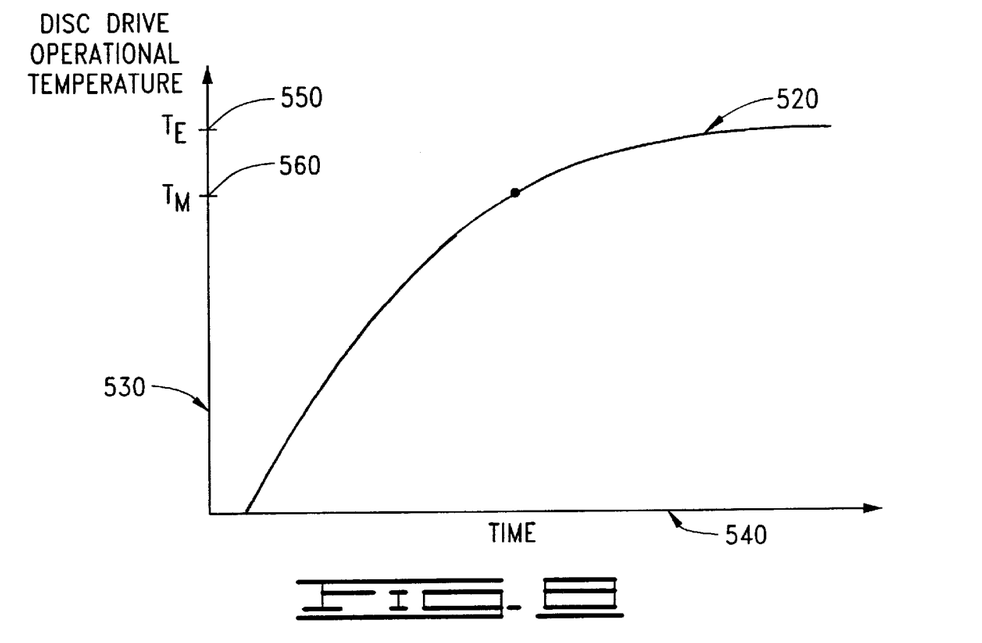
FIG. 8 provides a corresponding graphical representation of the operational temperature of the disc drive of FIG. 1 as the drive transitions from an initial, rest condition at an ambient temperature to a final, equilibrium temperature associated with steady-state operation over an extended period of time.

FIG. 8 presents a temperature curve 520 plotted against temperature on a y-axis 530 versus time on an x-axis 540. An equilibrium temperature in FIG. 8 is represented by $T_E$ 550 and a measured operating temperature is represented by $T_M$ 560. As shown in FIG. 6, upon disc drive initialization 410 and operation 570, the operational temperature of the disc drive 100 transitions from an initial, ambient temperature to the equilibrium temperature 550 associated with steady-state operation over an extended period of time.

Disc drive operation is represented by step 570 in the flow chart of FIG. 6, indicative that the disc drive 100 is then used for normal data transfer operations. As the disc drive 100 heats up, it will transition from ambient and gradually increase until thermal equilibrium at $T_E$ 550 is reached. The primary heat source for the disc drive 100 is the spindle motor 106, but heat also is generated by the actuator coil 114 and the electronics on the PWA as the disc drive is operated. During operation, the disc drive processor 210 will use commands stored in MEM 230 to detect errors associated with self-excited mechanical resonances. This operation, represented as step 580 in the flow chart of FIG. 6, occurs any time after the initiation step 410 as directed by MEM 230 programming. Once an error is detected in step 580, the disc drive processor 210 is programmed to apply corrective actions as shown at step 590 of FIG. 6.

Next, as shown at step 600 of FIG. 6, the processor 210 checks to see if the error has been resolved and returns to normal operations as indicated by the arrow 610 in FIG. 6. If the error has not been corrected, or in the alternative, is one of the corrective steps that the processor 210 is programmed to take, the temperature $T_M$ 560 of the disc drive will be measured. This operation is represented by step 620 in the flow chart of FIG. 6. Next, as shown at step 630 of FIG. 6, this measured temperature ($T_M$) 560 is compared to the equilibrium temperature ($T_E$) 550 (FIG. 8). If the measured temperature 560 is less than the equilibrium temperature 550, the processor 210 instructs the spindle motor control circuit 206 to decrease the nominal rotational velocity 450 of the discs to a reduced operational rotational velocity 460. For example, if the decrement in rotational velocity is selected to be 3 percent, the rotational speed would decrease from 10,000 to 9,700 rpm. This operation is represented by step 640 in the flow chart of FIG. 6, and is depicted at 645 on the curve 420 in FIG. 7. The reduced operational rotational velocity 460 is applied in an attempt to reduce the effects of the self-excited mechanical resonance by modifying the excitation frequency spectrum input to remaining portions of the disc drive 100 by the spindle motor 106.

Next, as depicted at step 650, the processor 210 will apply the corrective actions it is programmed to perform and are necessary to help correct the error. These can involve a variety of actions, such as discussed in U.S. Pat. No. 5,721,816 issued to Kusbel et. al., assigned to the assignee of the present invention. Next, as shown at step 660 of FIG. 6, the processor checks to see if the error has been resolved and will, after temporarily operating at the reduced velocity 460, instruct the spindle motor control circuitry 106 to restore the rotational velocity of the discs to the nominal operational rotational velocity 450 as depicted at 665 in FIG. 7, thus returning the disc drive 100 to normal operating conditions. Alternatively, the processor can continue to operate the disc drive at the reduced rotational velocity 460, or to sequentially switch between the reduced rotational velocity 460 and the nominal operational rotational velocity 450 until the disc drive reaches the equilibrium temperature 550. If at that time the error has not been corrected or if the measured temperature 560 is at equilibrium temperature 550, an error flag will be set, as depicted by step 680 in FIG. 6.

During the above corrective actions, when the disc drive 100 detects the presence of a self-excited mechanical resonance, (step 580, FIG. 6), the reduction of rotational velocity acts to reduce effects of the self-excited mechanical resonance (step 640, FIG. 6) by changing the frequencies the disc drive 100 experiences. These frequencies are dependent on the rotational velocity of the disc drive 100. The disc drive will continue to operate at the reduced rotational velocity as long as is necessary during the initialization procedure after which the rotational velocity of the disc is restored to the nominal operational rotational velocity (step 670, FIG. 6).

In view of the foregoing, it will be recognized that the present invention is directed to an apparatus and method for improving disc drive operational performance.

In accordance with preferred embodiments, a disc drive 100 includes a spindle motor 106 supporting a disc 108 having a disc recording surface. A controllably positionable head 120 is placed adjacent the disc to transfer data between the disc and a host computer 200 in which the disc drive is mountable. A spindle motor control circuit 206, operably coupled to the spindle motor 106, applies current to the spindle motor 106 to rotate the disc 108 at a desired rotational velocity 450. A temperature sensor 232 indicates operational temperature of the disc drive 100, and a disc drive processor 210 controls top level operation of the disc drive.

During operation, the disc drive is initialized by applying current to the spindle motor 106 to accelerate the disc from rest to a nominal operational rotational velocity (step 410, FIG. 6). The disc drive is thereafter operated as the temperature of the disc drive increases from an initial, ambient temperature to an equilibrium temperature 550 (FIG. 8). During such operation, before the temperature of the disc drive reaches the equilibrium temperature, the disc drive detects the presence of a self-excited mechanical resonance within the disc drive as a result of the disc rotating at the nominal operational rotational velocity (step 580, FIG. 6). The disc drive proceeds to decrease the rotational velocity of the disc to a reduced operational rotational velocity less than the nominal operational rotational velocity to reduce effects of the self-excited mechanical resonance (step 640, FIG. 6), after which the rotational velocity of the disc is restored to the nominal operational rotational velocity (step 670, FIG. 6).

For purposes of the appended claims, consistent with the foregoing discussion "equilibrium temperature" will be construed as a temperature that the disc drive reaches during steady-state conditions after an extended period of operation, once the disc drive has completed the warming cycle. The term "circuit" will be understood as comprising hardware or firmware/software implementations. Method steps have been individually labeled for convenience, but are not necessarily limited to the order shown, unless otherwise indicated.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for improving operational performance of a disc drive having a spindle motor which controllably rotates a recording disc, the method comprising steps of:
   (a) initializing the disc drive by applying current to the spindle motor to accelerate the disc from rest to a nominal operational rotational velocity;
   (b) operating the disc drive as temperature of the disc drive increases from an initial, ambient temperature to an equilibrium temperature; and
   (c) during the operating step (b), before the temperature of the disc drive reaches the equilibrium temperature:
      (c1) detecting presence of a self-excited mechanical resonance within the disc drive as a result of the disc rotating at the nominal operational rotational velocity;
      (c2) decreasing the rotational velocity of the disc to a reduced operational rotational velocity less than the nominal operational rotational velocity to reduce effects of the self-excited mechanical resonance; and
      (c3) restoring the rotational velocity of the disc to the nominal operational rotational velocity.

2. The method of claim 1, wherein mechanical configuration of the disc drive is selected so that the effects of the self-excited mechanical resonance are greater at temperatures less than the equilibrium temperature as compared to when the disc drive is operated at the equilibrium temperature.

3. The method of claim 1, wherein the detecting step (c1) comprises identifying an error condition indicative of the presence of the self-excited mechanical resonance.

4. The method of claim 3, wherein the detecting step (c1) further comprises applying corrective actions to resolve the error condition.

5. The method of claim 3, wherein the decreasing step (c2) comprises applying corrective actions to resolve the error condition as the disc is rotated at the reduced operational rotational velocity.

6. The method of claim 1, wherein the decreasing step (c2) and the restoring step (c3) are sequentially repeated until the temperature of the disc drive reaches the equilibrium temperature.

7. A disc drive, comprising:
   a spindle motor supporting a disc having a disc recording surface;
   a head controllably positionable adjacent the disc to transfer data between the disc and a host computer in which the disc drive is mountable;
   a spindle motor control circuit, operably coupled to the spindle motor, which applies current to the spindle motor to rotate the disc at a desired rotational velocity;
   a temperature sensor which indicates operational temperature of the disc drive; and
   a disc drive processor operably coupled to the head, the spindle motor control circuit and the temperature sensor, having associated programming to:
      (a) accelerate the disc from rest to a nominal operational rotational velocity;
      (b) monitor the operational temperature of the disc drive as the operational temperature transitions from an initial, ambient temperature to an equilibrium temperature; and
      (c) temporarily reduce the rotational velocity of the disc from the nominal operational rotational velocity to a reduced rotational velocity upon detection of a self-excited mechanical resonance within the disc drive when the operational temperature is less than the equilibrium temperature.

8. The disc drive of claim 7, wherein the disc drive processor has further associated programming to:
   (d) restore the rotational velocity of the disc to the nominal operational rotational velocity when effects of the self-excited mechanical resonance are reduced.

9. The disc drive of claim 8, wherein the disc drive processor continues to sequentially perform programming steps (c) and (d) until the disc drive reaches the equilibrium temperature.

10. The disc drive of claim 7, wherein mechanical configuration of the disc drive is selected so that the effects of the self-excited mechanical resonance are greater at temperatures less than the equilibrium temperature as compared to when the disc drive is operated at the equilibrium temperature.

11. The disc drive of claim 7, wherein the disc drive processor detects the self-excited mechanical resonance as a result of detection of an error condition associated with the self-excited mechanical resonance.

12. The disc drive of claim 11, wherein the disc drive processor initiates a series of corrective actions in an attempt to resolve the error condition as the disc is rotated at the reduced rotational velocity.

13. A disc drive, comprising:

a spindle motor which rotates a disc at a desired rotational velocity; and reduction means for reducing effects of self-excited mechanical resonances within the disc drive when the disc drive is operated at an operational temperature less than an equilibrium temperature.

14. The disc drive of claim 13, wherein the reduction means comprises a disc drive processor having associated programming to:

(a) accelerate the disc from rest to a nominal operational rotational velocity;

(b) monitor the operational temperature of the disc drive as the operational temperature transitions from an initial, ambient temperature to an equilibrium temperature; and (c) temporarily reduce the rotational velocity of the disc from the nominal operational rotational velocity to a reduced rotational velocity upon detection of a self-excited mechanical resonance within the disc drive when the operational temperature is less than the equilibrium temperature.

* * * * *